United States Patent [19]

Ebert et al.

[11] Patent Number: 5,300,543
[45] Date of Patent: Apr. 5, 1994

[54] RECYCLABLE THERMOPLASTICS FOAM OF HIGH GLASS TEMPERATURE

[75] Inventors: Wolfgang Ebert, Krefeld; Jürgen Kirsch, Leverkusen; Burkhard Köhler; Wolfgang Beer, both of Krefeld; Siegfried Anders, Koeln; Rolf Dhein, Krefeld, all of Fed. Rep. of Germany

[73] Assignee: Bayer Aktiengesellschaft, Leverkusen, Fed. Rep. of Germany

[21] Appl. No.: 127,724

[22] Filed: Sep. 28, 1993

Related U.S. Application Data

[63] Continuation of Ser. No. 965,592, Oct. 23, 1992.

[30] Foreign Application Priority Data

Oct. 30, 1991 [DE] Fed. Rep. of Germany ....... 4135743
Apr. 23, 1992 [DE] Fed. Rep. of Germany ....... 4213326

[51] Int. Cl.$^5$ ................................................. C08J 9/12
[52] U.S. Cl. .......................................... 521/79; 521/85; 521/92; 521/93; 521/97; 521/150; 521/182; 521/189
[58] Field of Search ................ 521/79, 85, 92, 93, 521/97, 150, 182, 189

[56] References Cited

U.S. PATENT DOCUMENTS

| 3,277,929 | 10/1966 | Chadwick et al. | 260/2.5 |
| 3,969,313 | 7/1976 | Aishima et al. | 260/40 R |
| 4,407,768 | 10/1983 | Garcia et al. | 264/54 |
| 4,446,254 | 5/1984 | Nakae et al. | 521/92 |
| 4,889,875 | 12/1989 | Aust et al. | 521/123 |
| 5,132,331 | 7/1992 | Köhler et al. | 521/85 |

FOREIGN PATENT DOCUMENTS 415744 3/1991 European Pat. Off. .
2729493 11/1978 Fed. Rep. of Germany .

OTHER PUBLICATIONS

Patent Abstract of Japan, vol. 4, No. 65, May 16, 1990, JP 55-31871, Mar. 6, 1980.
Abstract of JP 520445667.
Chemical Abstracts, vol. 89, 1978 Abstract No. 44653g, Kubo et al, Thermoplastic Foams & JP-A-7 829 368 (Matsushita Electric Works Ltd).

Primary Examiner—Morton Foelak
Attorney, Agent, or Firm—Joseph C. Gil; Aron Preis

[57] ABSTRACT

A thermoplastic molding composition suitable for the preparation of foam is disclosed. The composition comprises a thermoplastic resinous component and a foaming agent which includes A) (i) 0.01 to 4.8% alumina hydrate (aluminum hydroxide) in combination with (ii) 0.01 to 4.8% of an acidic additive or B) 0.01 to 4.8% of the reaction product of said (i) and said (ii), the percentages being relative to the weight of the composition to be foamed. The invention is based on the finding that the foaming of the composition does not lead to any significant reduction in molecular weight of the resinous component or to troublesome discoloration of the foam, even during its re-extrusion.

10 Claims, No Drawings

RECYCLABLE THERMOPLASTICS FOAM OF HIGH GLASS TEMPERATURE

This application is a continuation of application Ser. No. 07/965,592 filed Oct. 23, 1992.

FIELD OF THE INVENTION

The invention concerns thermoplastic molding compositions and more particularly, compositions suitable for the preparation of thermoplastic foams.

SUMMARY OF THE SUMMARY

A thermoplastic molding composition suitable for the preparation of foam is disclosed. The composition comprises a thermoplastic resinous component and a foaming agent which includes A) (i) 0.01 to 4.8% alumina hydrate (aluminum hydroxide) in combination with (ii) 0.01 to 4.8% of an acidic additive or B) 0.01 to 4.8% of the reaction product of said (i) and said (ii), the percentages being relative to the weight of the composition to be foamed. The invention is based on the finding that the foaming of the composition does not lead to any significant reduction in molecular weight of the resinous component or to troublesome discoloration of the foam, even during its re-extrusion.

BACKGROUND OF THE INVENTION

Foams of high molecular weight polycarbonates are known (see, for example, DE-AS 1,031,507). Suitable blowing agents are, for example, blowing agents which eliminate $CO_2$ or inert gases, such as $N_2$ or $CO_2$. A distinct reduction in the molecular weights is generally observed. The non-volatile decomposition products of the blowing agent remain in the foams.

It is also known that aromatic polycarbonates can only be satisfactorily processed in completely dry form. Any moisture present leads during processing to a reduction in molecular weight and to the formation of bubbles (cf. Plastics Technology 10, 1964, pages 32 to 36; GB-PS 841,652).

Accordingly, the problem addressed by the present invention was to develop a fine-cell foam which would undergo only a slight reduction, if any, in molecular weight, even during re-extrusion and, optionally, re-foaming.

This problem has been solved by the combination of aluminum hydroxides and acidic additives.

DETAILED DESCRIPTION OF THE INVENTION

This invention relates to thermoplastic foams which are characterized in that the foaming agents used are alumina hydrates (aluminum hydroxides) in quantities of 0.01% by weight to 4.8% by weight, preferably in quantities of 0.1% by weight to 4.0% by weight and, more preferably in quantities of 0.1% by weight to 2.5% by weight in combination with acidic additives, preferably acidic salts containing water of crystallization, in quantities of 0.01% by weight to 4.8% by weight, preferably in quantities of 0.01% by weight to 4.8%. by weight, preferably in quantities of 0.1% by weight to 4.0% by weight and, more preferably, in quantities of 0.1% by weight to 2.5% by weight or reaction products of these foaming agents with one another in quantities of 0.01% by weight to 4.8% by weight and preferably in quantities of 0.1% by weight to 4.0% by weight, all the percentages by weight being based on the weight of the particular thermoplastic to be foamed.

The thermoplastics suitable in the present invention are predominantly amorphous or transparent thermoplastics, for example transparent polyamides of the type produced, for example, from adipic acid and hexamethlyene diamine together with other carboxylic acids, such as terephthalic or isophthalic acid and/or dimer fatty acids; polyethersulfones polysulfones and polyether ketones of 4,4-dichlorosulfone or 4,4-difluorobenzophenone and one or more of the aromatic dihydroxy compounds mentioned under the polycarbonate units providing the corresponding polymer is predominantly amorphous. ABS polymers and, in particular, polycarbonates and polyester carbonates and block copolymers thereof containing siloxane or dimer fatty acid are also suitable.

Mixtures of the above-mentioned thermoplastics for example mixtures of polycarbonates and ABS polymers are also suitable as the thermoplastics.

Thermoplastic aromatic polycarbonates in the context of the present invention are polycarbonates which have been produced from diphenol and carbonate donors by any of the standard methods known from the literature [see, for example, H. Schnell, II "Chemistry and Physics of Polycarbonates", Interscience Publishers, New York, 1964; US-PS 3,028,365 and DE-OS 3,832,396 (Le A 26 344)].

Diphenols for polycarbonates such as these may be, for example, hydroquinone, resorcinol, dihydroxydiphenyls, bis-(hydroxyphenyl)alkane bis(hydroxyphenyl)cycloalkanes, bis(hydroxyphenyl)sulfides, bis(-hydroxyphenyl)ethers, bis-(hydroxyphenyl)-ketones, bis(hydroxyphenyl)-sulfones, bis-(hydroxyphenyl)-sulfoxides, α,α-bis-(hydroxyphenyl) diisopropylbenzenes and nucleus-alkylated and nucleus-halogenated compounds thereof.

Preferred diphenols are, for example, 4,4'-dihydroxydiphenyl, 2,2-bis-(4-hydroxyphenyl)-propane, 2,4-bis(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis(4-hydroxyphenyl)-3,3,5-trimethyl cyclohexane.

Particularly preferred diphenols are, for example, 2,2-bis-(4-hydroxyphenyl)-propane, 2,2-bis-(3,5-dimethyl-4-hydroxyphenyl)-propane, 2,2-bis-(3,5 dichloro-4-hydroxyphenyl)propane, 2,2-bis-(3,5-dibromo-4-hydroxyphenyl)propane, 1,1-bis-(4-hydroxyphenyl)-cyclohexane and 1,1-bis-(4-hydroxyphenyl)-3,3,5-trimethyl cyclohexane.

The diphenols may be used both individually and in admixture with one another, i.e. both homopolycarbonates and copolycarbonates are included. The diphenols are known from the literature or may be produced by methods known from the literature.

Small quantities, preferably of 0.05 to 2.0 mol %, based on the mols diphenols used, of trifunctional or more than trifunctional compounds, more particularly those containing three or more than three phenolic hydroxyl groups, may also be used. Some of the compounds containing three or more than three phenolic hydroxyl groups which may be used in accordance with the invention are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenyl methane, 2,2-bis-[4,4-bis-(4-hydroxyphenyl)-cyclohexyl]-propane, 2,4-bis(4-hydroxyphenylisopropyl)-phenol, 2,6-bis-(2-hydroxy-5'-methylbenzyl)-4-methylphenol, 2(4-hydroxyphenyl)-2-(3 4-dihydroxyphenyl)-propane,hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-(4',4''-dihydroxytriphenyl)-methylbenzene.

Other possible branching agents are 2,4-dihydroxybenzoic acid, trimesic acid, cyanuric chloride and 3,3-bis-(3-methyl-4-hydroxyphenyl)-2-oxo-2, 3-dihydroindole. The 0.05 to 2 mol %, based on diphenols used, of branching agents optionally used in accordance with the invention may either be initially introduced into the aqueous alkaline phase with the diphenols themselves and the molecular weight regulators or may be added before phosgenation in solution in an organic solvent.

Suitable molecular weight regulators are the known chain terminators, preferably monophenols.

The aromatic polycarbonates according to the invention have a weight average molecular weights Mw (as determined by gel permeation chromatography) in the range from 5,000 to 50,000 and preferably in the range from 15,000 to 35,000.

The solution viscosities are accordingly in the range from 1.15 to 1.35, as measured in dichloromethane (0.5 g/100 ml).

The thermoplastic polycarbonates are preferably foamed without drying.

Thermoplastic aromatic polyester carbonates in the context of the invention are aromatic polycarbonates in which carbonate structural units are partly (max. 50 mol-%) replaced in known manner by aromatic dicarboxylate structural units.

Suitable aromatic dicarboxylic acids are, for example, orthophthalic acid, terephthalic acid, isophthalic acid tert. butyl isophthalic acid, 3,3'-diphenyl dicarboxylic acid, 4,4'-diphenyl dicarboxylic acid, 4,4'-diphenyl ether dicarboxylic acid, 4,4'-benzophenone dicarboxylic acid, 3,4'-benzophenone dicarboxylic acid, 4,4'-diphenylsulfone dicarboxylic acid, 2,2-bis-(4-carboxyphenyl)-propane, trimethyl-3-phenylindane-4,5'-dicarboxylic acid.

Of the aromatic dicarboxylic acids, terephthalic acid and/or isophthalic are particularly preferred.

Suitable diphenols are those mentioned above with reference to the production of the polycarbonates.

The same also applies to the branching agents and to the monophenolic chain terminators, although in this case aromatic monocarboxylic acids may also be used, for example, in the form of their acid chlorides or esters.

The carbonic acid may be incorporated in the polyester carbonates either via $COCl_2$ or via diphenyl carbonate, depending on the choice of the production process, i.e. on whether the polyester carbonates are produced by interfacial polycondensation or by melt transesterification.

The same applies to the aromatic dicarboxylic acids. They are either used as aromatic dicarboxylic acid dichlorides in the interfacial process or as dicarboxylic acid diesters in the melt transesterification process. The same applies where monocarboxylic acids are used as chain terminators.

The polyester carbonates to be foamed in accordance with the invention are produced by known methods, i.e. as already mentioned, for example, by the interfacial process or by melt transesterification.

Accordingly, the polyester carbonates to be foamed may be either linear or branched in known manner. They are preferably foamed without drying.

The aromatic polyester carbonates according to the invention have average weight average molecular weights Mw (as determined by gel permeation chromatography) in the range from 5,000 to 50,000 and preferably in the range from 15,000 to 35,000. The solution viscosities are accordingly in the range from 1.15 to 1.35, as measured in dichloromethane (0.5 g/100 ml).

The molar ratio of carbonate units to aromatic dicarboxylate units in the polyester carbonates to be foamed in accordance with the invention is at least 50:50, preferably 75:25 and, more preferably, 90:10.

Alumina hydrates (aluminum hydroxides) suitable for use in accordance with the invention correspond to the following formula

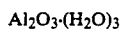

$$Al_2O_3 \cdot (H_2O)_3$$

and are known as such from the literature.

Alumina hydrates such as these are used in particle sizes of 0.1 μm to 400 μm and preferably in particle sizes of 0.3 μm to 100 μm. Other inorganic impurities should be kept to a minimum, i.e. should not exceed 1.5%.

Acidic additives in the context of the invention are, for example, organic acids and inorganic acids. Suitable inorganic acids are m-phosphoric acid, mineral acids bound to aluminosilicates, acidic aluminum oxides or silica.

Suitable organic acids are aromatic polycarboxylic acids, more particularly aromatic tricarboxylic acids, above all those of which the carboxyl groups are not capable of forming a 5-ring or 6-ring dianhydride.

Suitable polycarboxylic acids are, for example, trimesic acid, isophthalic acid, terephthalic acid, 3,3'-, 4,4'- or 3,3'-diphenyl ether dicarboxylic acid, 2,6-naphthalene dicarboxylic acid, trimellitic acid, 1,4, 5,8-naphthalene tetracarboxylic acid, 3,3',4,4'-benzophenone tetracarboxylic acid, 2,2',4,4'-diphenylsulfone tetracarboxylic acid, phthalic acid and 2,2',4,4'-diphenylether tetracarboxylic acid, and also aromatic hydroxypolycarboxylic acids, such as 3- or 4-hydroxyphthalic acid, hydroxyterephthalic acid and 2,5-dihydroxyterephthalic acid. The preferred polycarboxylic acid is trimesic acid.

Other suitable organic acids are aliphatic hydroxycarboxylic acids, such as glyoxylic acid, lactic acid, hydroxycaproic acid, γ-hydroxybutyric acid, malic acid or tartaric acid.

Acidic additives in the context of the invention are, in particular, the monosalts of organic dicarboxylic acids and the mono- or disalts of organic tricarboxylic acids which have Na, K, Mg, Ca, Zn or Al as counter-ion, preferably Na or Ca as counter-ion.

However, particularly preferred acidic additives are acidic mineral acid or organic acid salts containing water of crystallization. The acids in question are the partly neutralized polybasic acids, for example the "hydrogen" salts of phosphoric acid boric acid and sulfuric acid, the alkali metal, alkaline earth metal and colorless heavy metal salts and aluminum salts being preferred. Particular preference is attributed to the sodium, potassium, magnesium, calcium, zinc and aluminum salts, for example, primary and secondary sodium and calcium sulfate or phosphate.

Accordingly, primary sulfates or primary or secondary phosphates with Ha, K, Mg, Ca, Zn or Al as counter-ion are particularly suitable as the acidic salts containing water of crystallization.

Primary sodium or calcium phosphates are particularly preferred as the acidic salts containing water of crystallization.

Reaction products of alumina hydrate and an acidic additive are also suitable as foaming agents in accordance with the present invention. For instance, the reaction product of the alumina hydrates, i.e. the aluminum hydroxides, with one or more acidic additives, for example neutral aluminum salts of mineral acids which are synthesized before foaming and subsequently incorporated in the thermoplastic are also suitable.

The thermoplastic foams according to the invention are produced by extruding or injection-molding the composition contain the resin and the foaming agent in extruders or injection-molding machines at temperatures of 220° to 380° C. to form foamed moldings.

Accordingly, the present invention also relates to a process for the production of the thermoplastic foams according to the invention, characterized in that the foaming agent and the thermoplastics are extruded or injection-molded in corresponding machines (extruders or injection-molding machines) at temperatures of 220° to 380° C. to form foamed moldings.

The foaming process according to the invention may also be carried out in the presence of additives of the type typically used in the production of foams, such as reinforcing materials, for example glass fibers, and/or nucleating agents and/or flameproofing agents and/or mold release agents and/or lubricants, dyes and/or pigments, for example rutile or carbon black, and/or stabilizers against heat, UV radiation and moisture.

Accordingly, the present invention relates to a modification of the foaming process according to the invention in which typical additives, such as reinforcing materials, nucleating agents, flameproofing agents, mold release agents, lubricants, dyes, pigments and/or stabilizers, are incorporated in the thermoplastics to be foamed before foaming.

In addition, the present invention relates to the additive-containing foam moldings obtainable by the process according to the invention.

EXAMPLES

Example 1

200 g BPA polycarbonate ($\eta=1.28$) is extruded at 230° C. together with 0.5% by weight alumina hydrate and 0.5% by weight sodium dihydrogen phosphate ($\times 2 H_2O$) A colorless foam having a density of 0.48 g/cm$^3$ was obtained. The foam had a relative viscosity of 1.27.

The foam thus obtained was chopped and
a) re-extruded; polycarbonate having a rel. viscosity $\eta$ of 1.27 is obtained
b) re-extruded at 230° C. with another 0.5% by weight alumina hydrate and 0.5% by weight sodium dihydrogen phosphate ($\times 2H_2O$) A colorless foam having a density of 0.57 g/cm$^3$ was obtained. The foam had a relative viscosity of 1.27.

Example 2

(Comparison)

200 g BPA polycarbonate ($\eta=1.28$) is extruded at 230° C. together with 0.5% by weight alumina hydrate. A colorless foam having a density $\tau$ of 0.44 g/cm$^3$ was obtained. The foam had a relative viscosity of 1.23.

Example 3

200 g BPA polycarbonate ($\eta=1.28$) is extruded at 230° C. together with 1.0% by weight alumina hydrate and 1.0% by weight sodium dihydrogen phosphate ($\times 2H_2O$). A colorless foam having a density of 0.37 g/cm$^3$ was obtained. The foam had a relative viscosity of 1.27.

Example 4

200 g SPA polycarbonate ($\eta=1.28$) is extruded at 230° C. together with 1.0% by weight alumina hydrate and 1.0% by weight prim. calcium phosphate $\times H_2O$. A colorless foam having a density of 0.67 g/cm$^3$ was obtained. The foam had a relative viscosity of 1.27.

Example 5

200 g SPA polycarbonate ($\eta=1.28$) is extruded at 230° C. together with 1.0% by weight alumina hydrate and 1.5% by weight prim. sodium phosphate $\times 2H_2O$. A colorless foam having a density $\tau$ of 0.46 g/cm$^3$ was obtained. The foam had a relative viscosity of 1.29.

Example 6

200 g SPA polycarbonate ($\eta=1.28$) is extruded at 230° C. together with 1.0% by weight alumina hydrate and 1.0% by weight sec. sodium phosphate $\times 12H_2O$. A colorless foam having a density of 0.41 g/cm$^3$ was obtained. The foam had a relative viscosity of 1.27.

Example 7

200 g SPA polycarbonate ($\eta=1.28$) is extruded at 230° C. together with 1.0% by weight alumina hydrate and 1.0%, by weight sec. calcium phosphate $\times 2H_2O$. A colorless foam having a density of 0.42 g/cm$^3$ was obtained. The foam had a relative viscosity of 1.27.

What is claimed is:

1. A thermoplastic molding composition comprising a thermoplastic resinous component selected from the group consisting of polycarbonate, polyester carbonate, polysulfone, polyethersulfone and ABS polymers and a foaming agent, said foaming agent consisting of either
   A) a mixture of (i) and (ii) where
      (i) is 0.01 to 4.8% alumina hydrate conforming to $$Al_2O_3 \cdot (H_2O)_3$$

and where
      (ii) is 0.01 to 4.8% of an acidic additive selected from the group consisting of organic acids, inorganic acids and the corresponding salts of said acids, or
   B) which is 0.01 to 4.8% of the reaction products of said (i) and said (ii), said percentages being relative to the weight of said composition.

2. The composition of claim 1 wherein said salts containing water of crystallization.

3. The composition of claim 2 wherein said salts are selected from the group consisting of primary sulfates, primary phosphates and secondary phosphates.

4. The composition of claim 3 wherein said salts have a counter-ion selected from the group consisting of Na, K, Mg, Ca, Zn and Al.

5. The composition of claim 2 wherein said salt is a primary sodium or calcium phosphates.

6. The composition of claim 1 wherein said resinous component is selected from the group consisting of polycarbonate and polyester carbonate.

7. The process for the production of a thermoplastic foam comprising extruding or injection molding the composition of claim 6 in its undried condition at temperatures of 220° to 380° C. to form foamed moldings.

8. A thermoplastic molding composition consisting of a thermoplastic resinous component selected from the group consisting of polycarbonate, polyester carbonate, polysulfone, polyethersulfone and ABS polymers, a foaming agent and at least one additive selected from the group consisting of reinforcing materials, nucleating agents, flameproofing agents, mold release agents, lubricants, dyes, pigments and stabilizers, said foaming agent consisting of either of A) a mixture of (i) and (ii) where
  (i) is 0.01 to 4.8% alumina hydrate conforming to $$Al_2O_3 \cdot (H_2O)_3$$

and where
  (ii) is 0.01 to 4.8% of an acidic additive selected from the group consisting of organic acids, inorganic acids and the corresponding salts of said acids, or
B) which is 0.01 to 4.8% of the reaction products of said (i) and said (ii), said percentages being relative to the weight of said composition.

9. A process for the production of a foamed article comprising extruding or injection molding of the composition of claim 1 at temperatures of 220° to 380° C.

10. A process for the production of a foamed article comprising extruding or injection molding of the composition of claim 8 at temperatures of 220° to 380° C.

* * * * *